United States Patent [19]
Catelli et al.

[11] Patent Number: 5,810,151
[45] Date of Patent: Sep. 22, 1998

[54] APPARATUS FOR UPENDING AND TRANSPORATING BOTTLES IN CONTINUOUS CYCLE

[75] Inventors: Camillo Catelli, Parma; Leo Bonetti, Reggio Emilia, both of Italy

[73] Assignee: Rossi & Catelli, Parma, Italy

[21] Appl. No.: 767,629

[22] Filed: Dec. 17, 1996

[51] Int. Cl.⁶ ............................................. B65G 47/244
[52] U.S. Cl. ..................... 198/406; 198/417; 198/402
[58] Field of Search ................... 198/402, 403, 198/406, 417, 817, 836.1, 735.3, 735.1, 408, 404

[56] References Cited

U.S. PATENT DOCUMENTS

| | | | |
|---|---|---|---|
| 2,184,100 | 12/1939 | Mondloch | 198/403 |
| 2,604,200 | 7/1952 | Hohl et al. | 198/402 |
| 2,657,023 | 10/1953 | Wolke | 198/403 |
| 3,495,291 | 2/1970 | Copping et al. | 198/417 |
| 4,031,764 | 6/1997 | Curtis | 74/57 |
| 4,104,081 | 8/1978 | Totten | 198/417 |
| 4,479,574 | 10/1984 | Julius et al. | 198/836.1 |
| 4,633,955 | 1/1987 | Gresham | 198/417 |
| 4,802,571 | 2/1989 | Born et al. | 198/817 |
| 4,817,777 | 4/1989 | Postel | 193/46 |

FOREIGN PATENT DOCUMENTS 0 571 946 A1  12/1993  European Pat. Off. ........ B65G 33/04

*Primary Examiner*—Joseph E. Valenza
*Assistant Examiner*—Patrick Mackey
*Attorney, Agent, or Firm*—Thomas O. Herbert; Flehr Hohbach Tes Albritton & Herbert

[57] ABSTRACT

An apparatus (1) for upending and transporting bottles (2) in continuous cycle is utilized especially in continuous cycle bottling plants using plastic bottles. The apparatus (1) comprises a horizontal axis (X) tubular body (70) having a guide (7) constituted by a slot (71) in a wall thereof, which slot (71) is of a breadth such as to permit passage of a neck (20) of a bottle (2). The slot (71) has an intermediate portion (71b) winding helically about the tubular body (70) by an angle equal to half a revolution. A bottle feed line (3) feeds the bottles (2) one at a time to the apparatus (1). Internally of the tubular body (70) a drive screw is rotatable about its axis (X) to engage the bottles (2) by the necks (20) thereof, urging them along the guide (7).

5 Claims, 3 Drawing Sheets

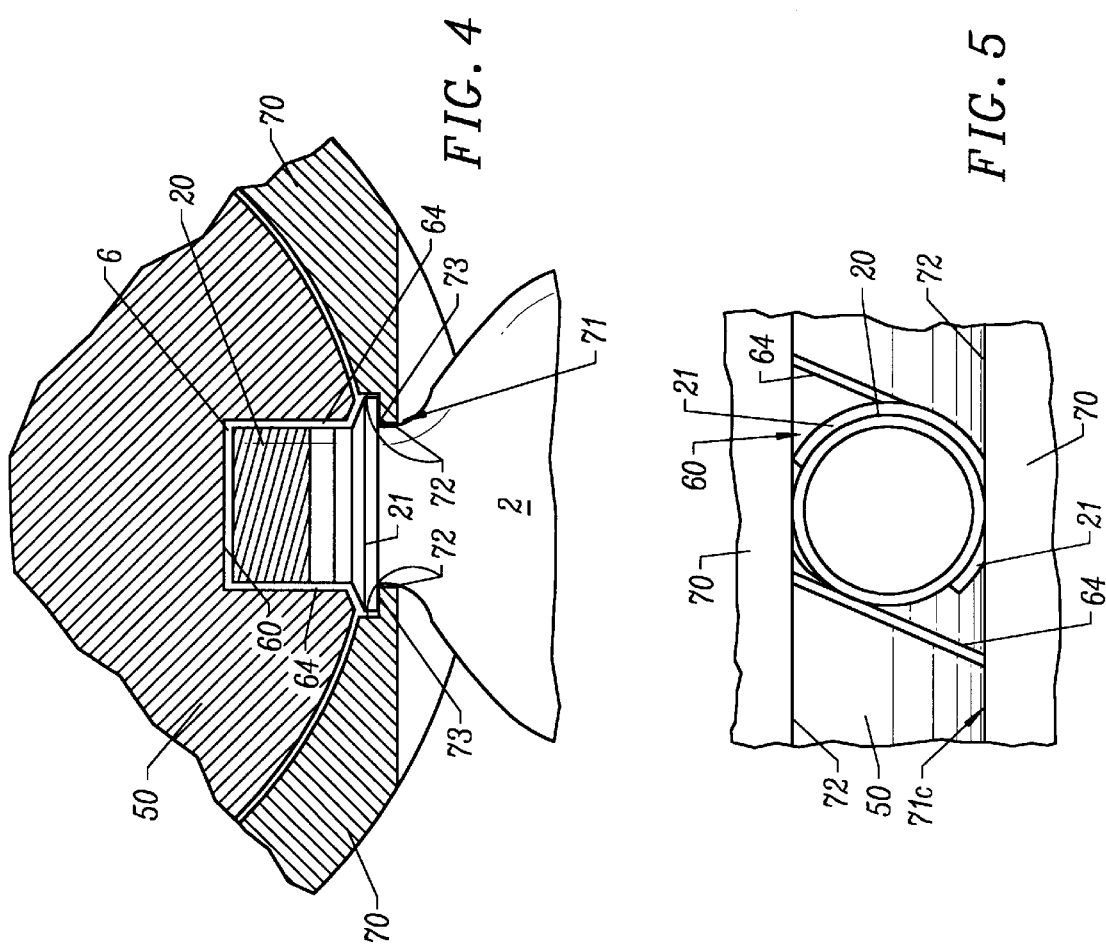
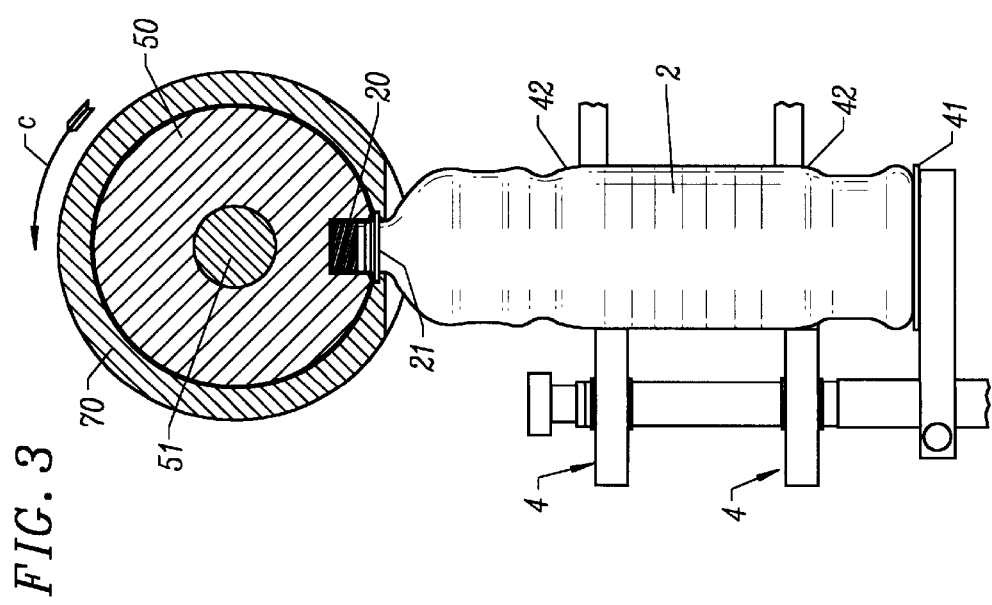

APPARATUS FOR UPENDING AND TRANSPORATING BOTTLES IN CONTINUOUS CYCLE

The present invention relates generally to apparatus for handling bottles in bottling plants, especially for use in continuous bottling plants where the bottles are made of plastic material. More specifically, the invention relates to such apparatus to invert the bottles thus turning them upside down and/or right side up.

BACKGROUND OF THE INVENTION

Known plants of the above kind comprise a bottle feed line on which the bottles are advanced in single file, one at a time. The bottles are fed successively to various operative groups of the plant, usually including a washing group, at least one sterilization or cleaning group, a filling group and a capping group. Each of these groups has apparatus which take one bottle off at a time and transport it to the various operative stations of the appropriate group.

At the start of the feed line the bottles have their open ends facing upwards while, when they go through the washing, sterilization or cleaning groups, their necks face downwards—to be returned upright when they reach the filling and capping stations. Thus the bottles are upended at least twice.

Several apparatus are known for upending the advancing bottles in bottling plants. One of these comprises a tunnel in which the bottles are advanced. The opening and the transverse internal contour of the path through such tunnels roughly correspond to the external shape of a bottle. The inclination of the transverse section varies progressively along the axis of the tunnel so as to rotate the bottles as they advance through it. In substance, the walls of the tunnel are helix shaped. From the inlet to the outlet of the tunnel the transverse section rotates by 180 degrees. The bottles passing through the tunnel from the inlet to the outlet are thus guided by the tunnel walls to rotate the 180 degrees. The bottle advancement along the tunnel is effected by pushing them or by gravity.

This prior-art apparatus, known in the jargon as a "twist", exhibits some drawbacks. First, the plastic bottles advancing along the tunnel are subject to crushing forces, mainly due to the fact that during the advancement each bottle presses against the side of the bottle preceding it, resulting in deformations in some of the exiting bottles, as well as cracks, breakages, and the like. Second, when a new bottle shape is utilized, the whole "twist" has to be replaced or rebuilt. Third, the "twist" is massive, especially lengthwise.

Another known tipping apparatus is provided with a plier to grip a group of bottles; each plier-bottle group is then tipped, generally by means of cams, jacks or other mechanical devices, thus upending the bottles.

As there are a considerable number of sections - running into tens, in fact - in a bottling plant, these apparatus become not only large and unwieldy, but are constructionally complicated and expensive.

BRIEF SUMMARY OF THE INVENTION

The main aim of the present invention is to provide an apparatus for upending and/or transporting bottles in continuous cycle, especially for a plastic bottle bottling plant, which overcomes the previously-mentioned drawbacks in the prior art.

An advantage of the invention is that it is constructionally simple and economical.

A further advantage of the invention is that it keeps the bottles separated from each other by an equal distance one from a next.

Further, the invention can be used advantageously both as a bottle tipper, a bottle transporter or a combination of both.

A further advantage of the invention is that it can operate on bottles of different shapes, as long as the bottles exhibit a similar mouth, which is usually a standardized element.

These aims and advantages as well as others are all attained by the apparatus of the invention, as it is characterized in the following claims.

BRIEF DESCRIPTION OF THE DRAWINGS

Additional objects and features of the invention will be more readily apparent from the following detailed description of an embodiment of the invention, illustrated in the form of a non-limiting example, and the appended claims when taken in conjunction with the following drawings, in which:

FIG. 3 is a sectional view taken along the line III—III of FIG. 2;

FIG. 4 is an enlarged detailed view showing a portion of the bottle and apparatus of FIG. 3; and FIG. 5 is a detailed view of the bottle and apparatus shown in FIG. 1 with a part of the bottle removed.

DESCRIPTION OF THE PREFERRED EMBODIMENTS

Figure 1:
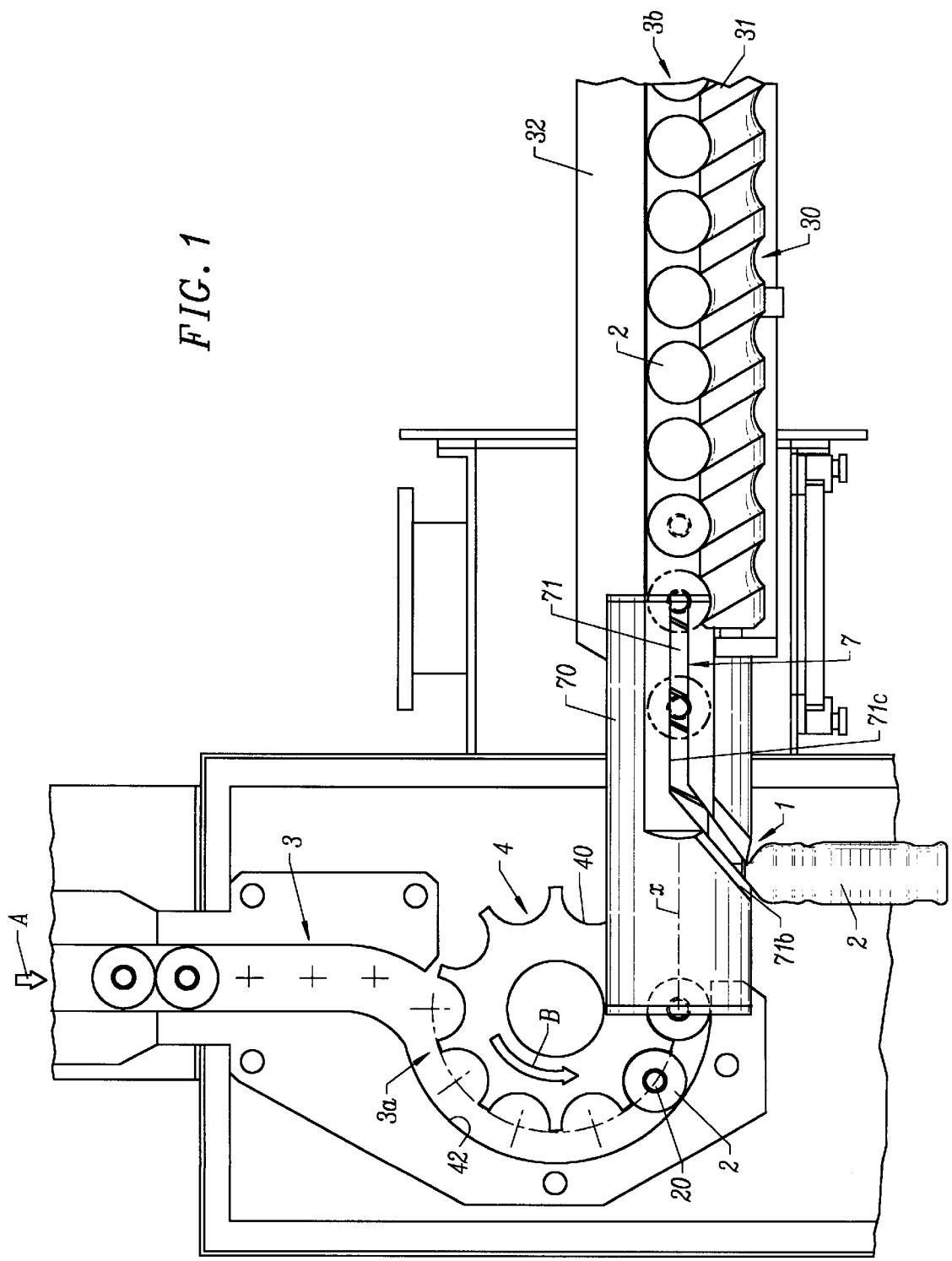
FIG. 1 is a top plan view of the apparatus of the invention inserted into a bottle feed line.
Figure 2:
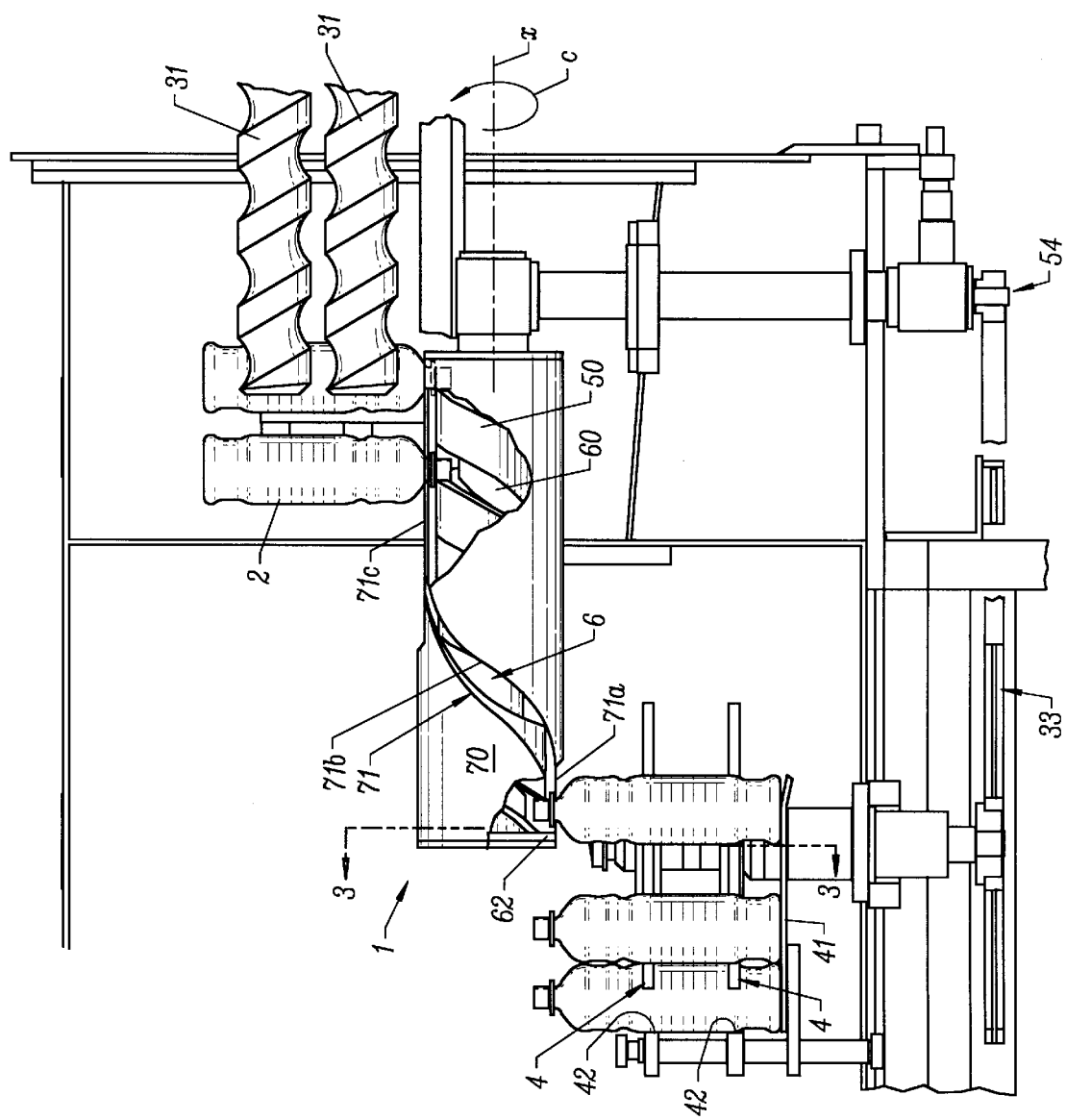
FIG. 2 is an elevational view of the apparatus and bottle feed line shown in FIG. 1 with some parts removed to better show others.

Referring to FIGS. 1 and 2 there is shown a bottling plant including an apparatus 1 in accordance with the invention for upending and/or transporting bottles 2. The bottling plant further includes a bottle feed line 3 along which the bottles advance one before another. The bottles 2 are provided with a neck 20 and an annular projection or collar 21. The feed line 3 includes paths 3a and 3b upstream and downstream, respectively, of the apparatus 1.

The bottles, with their mouths facing upwards, advance through the upstream feed line 3a in the direction indicated by the arrow A. This line includes two well known star conveyors 4 with a vertical rotating axis actuated by a motor and drive system denoted in its entirety by 33. Each star conveyor 4 includes, on its periphery, several recesses 40 at regular angular spacing. The two star conveyors are arranged in alignment for receiving the bottles 2. The two star conveyors 4 rotate in the direction indicated by arrow B thereby feeding the bottles 2 at a constant rate one at a time to the apparatus 1. Further provided is a rest plane 41 for the bottles as they are fed by the star conveyor 4 and a pair of cylindrical lateral walls 42 for containing the bottles 2.

The downstream feed line 3b located at the exit of the apparatus 1 comprises a bottle transport group 30 for transporting bottles with their mouths facing downwards. The bottle transport group 30, of known type, comprises two horizontal-axis drive screws 31, arranged one above the other, which act on the lateral walls of the bottles 2, two guides 32 parallel to the screws 31 and appropriate supports.

According to the invention the apparatus 1 is provided with a propelling element comprising a preferably cylindrical body 50 having a horizontal axis X lying in a vertical plane tangential to the star conveyor 4. The cylindrical body 50 is keyed on a shaft 51 rotating about the axis X and driven by a motor and drive system denoted in its entirety by 54. The cylindrical body 50 rotates in the direction indicated by arrow C in FIG. 3.

The external surface of the rotating cylindrical body 50 defines a helical cavity 6 which is preferably in the form of a channel 60 having side walls 64. The helix of the channel 60 is coaxial with the cylindrical body 50. The cross-section of the channel 60 is essentially the inversion of the external outline shape of a neck 20 of a bottle 2 but slightly larger.

A neck 20 can thus be inserted into the channel 60 through an opening 62 arranged inferiorly on the end of the cylindrical body 50 facing the star conveyors 4 and can exit from the channel 60 through an opening arranged superiorly on the opposite end. The pitch of the helix of the channel 60 is preferably greater than the diameter of a single bottle 2, thereby keeping the bottles separated from each other during their transit through the apparatus 1.

The cylindrical body 50 rotates in synchronism with the star conveyors 4 in such a way that a bottle carried by the star conveyors 4 is guided into the channel 60, the neck 20 thereof being inserted into the inlet opening 62. FIG. 4 shows the neck 20 of a bottle 2 as it is entering the channel 60.

The cylindrical body 50 comprises of the rotating screw element of a drive screw having the function, as will be better explained hereinafter, of impressing sufficient force on the bottles 2 to draw them along a predetermined course.

The cylindrical body 50 with the channel 60 is distinguished from other known drive screw type bodies for transporting bottles, such as for example the screws 31, in that the channel 60 acts on the neck 20 of the bottles 2 and not on the lateral walls thereof, as is the case with the screws 31. Also, the neck 20 is inserted into the channel 60 in such a way that the axis of a bottle 2 is radially directed towards the axis of rotation of the cylindrical body 50. Further, the axis of the bottle 2, during the transport and/or upending thereof, is kept in a generally radial disposition.

The cylindrical body 50 is coaxially enveloped by a fixed preferably tubular body 70. A guide 7, provided in the wall of the tubular body 70, also acts upon the necks 20 of the bottles 2. The guide 7, which defines the abovementioned predetermined course of the bottles 2, is preferably in the form of a slot 71 developed through the external surface of the tubular body 70 with an almost constant width. The slot 71 is defined by two facing parallel walls 72 widely enough spaced to admit a neck 20 of a bottle 2 to be inserted there-between. The parallel walls 72 include, over the whole length of the slot 71, two projecting lips 73 separated by a distance is smaller than the diameter of the collar 21 of a bottle 2.

In the example the slot 71 has an initial straight inlet portion 71a, a spiral intermediate portion 71b, and a straight terminal outlet portion 71c.

The initial portion 71a is parallel to the axis X and is arranged in the lowermost portion of the tubular body 70. The initial portion 71a guides the bottles in a movement of advancement only, without rotation.

The spiral portion 71b is coaxial with the channel 60 and winds about the tubular body 70 by an angle of 180 degrees such as to guide a bottle in a spiral movement composed of an advancement in the direction of axis X together with a rotation about the axis itself. At the end of the spiral portion 71b the bottle has been upended. There can exist cases where the bottle 2 has to be rotated continuously by a predetermined angle different from 180 degrees. In such cases the spiral portion 71b will wind about the axis X by whatever angle is required.

The terminal portion 71c is parallel to the axis X and is arranged on the uppermost portion of the tubular body 70. Like the initial portion 71a, the terminal portion 71c functions as a guide for a simple translation movement of the bottle 2 without rotation. A straight portion of the guide 7, in the nature of portions 71a and 71c, can also be arranged on a wall of the tubular body 70 at locations other than its lowermost or uppermost portion.

The functioning of the apparatus 1 is described hereinbelow.

A bottle 2 being advanced by the star conveyor 4 meets the apparatus 1. The cylindrical body 50 continuously rotates in synchronism with the star conveyor 4. The neck 20 of the bottle 2 enters the channel 60 when the opening 62 of the channel 60 is rotated to the lowermost point in its trajectory. At this lowermost point the opening 62 is aligned with the entry of the guide 7.

At this point the neck 20 of the bottle 2 is engaged both in the channel 60 and the slot 71. The rotation of the cylindrical body 50 urges the neck 20 of the bottle 2 to follow the course of the slot 71. First the neck 20 crosses the initial portion 71a of the slot 71. During this phase the collar 21 of the bottle 2 rests on the lips 73 of the slot 71. At this point, the rest plane 41 for the bottom of the bottle 2 is no longer necessary.

Subsequently the neck 20 of the bottle 2 is engaged by the spiral portion 71b of the slot 71. The channel 60, in cooperation with the portion 71b of the slot 71, forces the bottle 2 to rotate about the axis X, advancing axially at the same time. During this phase the bottle 2 follows a complex trajectory, one position of which is shown in FIG. 1. The axis of the bottle 2 is always kept more or less radial to the axis X.

After the neck 20 of the bottle 2 has crossed the spiral portion 71b of the slot 71, the bottle has been turned by 180 degrees. The upending of the bottle 2 is permitted by the fact that, as has been mentioned, during the upending the collar 21 of the bottle 2 is forced against the lips 73, thus preventing the neck 20 of the bottle 2 to exit the channel 60 radially in the direction of the bottle axis.

In the terminal portion 71c the bottles 2, with their necks facing downwards, advance without rotating and are finally passed to the downstream line 3b. Obviously the cylindrical body 50 and the bottle transport group 30 must be in synchronism.

The bottles 2 cross the apparatus 1 at a spacing which is equal to a multiple of the helix pitch of the channel 60. This distance setting prevents contact between the bottles 2 which might lead to collisions with consequent bottle crushing, cracking, deformations and so on.

Referring to FIG. 5, showing by way of example the straight terminal outlet portion 71c, the manner of engagement of the side walls 64 and the parallel walls 72 with the neck 20 of the bottle 2 can be understood. As can be seen, the side walls 64 and parallel walls 72 are all practically tangential to the neck 20 of the bottle and thus permit no lateral displacement of the bottle 2 except along the path of the stationary walls 72. Further, the neck 20 cannot radially exit, in the direction of the axis of the bottle 2, as it is prevented from doing so by the lips 73 which restrain the collar 21. While FIG. 5 specifically shows the terminal portion 71c the above explanation is also applicable to the other portions 71a and 71b.

Since the shape and the dimensions of the necks 20 of the bottles 2 and the relative collars 21 are generally standardized and are the same for all types of bottle shapes, the apparatus 1 is practically universal. This means that it is not necessary to replace the apparatus 1 when new bottle shapes are used.

It is evident that the longitudinal dimensions of the apparatus 1 are very small, and can be even further reduced by reducing the axial length of the intermediate portion 71*b* of the slot 71 which winds about the tubular body 70, or the lengths of the straight portions 71*a* and 71*c*.

An advantage of the apparatus 1 consists in the fact that it can also be used as a simple conveyor or translator of bottles. Indeed, at straight portions 71*a* and 71*c*, the apparatus 1 functions as a bottle conveyor with, in the former case, the bottles in the mouth-upwards position and in the latter case with their mouths a downward position. Obviously portions 71*a* and 71*c* can be lengthened or shortened as desired.

The apparatus 1 as presently described is used for upending bottles having their mouths initially upwards-facing, but with obvious modifications could be adapted for upending bottles having their mouths initially facing downwards.

While the present invention has been described with reference to a specific embodiment, the description is illustrative of the invention and is not to be construed as limiting the invention. Various modifications may occur to those skilled in the art without departing from the true spirit and scope of the invention as defined by the appended claims. For instance, the embodiment described has been directed to apparatus using straight portions 71*a* and 71*b* in the slot 71 but it should be recognized that one or both of these straight portions could be eliminated.

We claim:

1. An apparatus for transporting bottles in continuous cycle in a bottle feed line, comprising: a fixed body (70) bearing a guide (7) conformed and arranged in such a way as to receive a neck (20) of a bottle (2) transiting along the bottle feed line (3) and to guide said neck (20) of said bottle (2) along a predetermined course; means for urging said neck (20) along said predetermined course; means for preventing said neck (20) of said bottle (2) from exiting from said guide (7) in a direction of an axis of said bottle (2); said means for urging said neck (20) of said bottle (2) including a rotating cylindrical body (50); a channel (60) having breadth and depth of such dimensions adapted to receive said neck (20) of said bottle (2), said channel (60) extending along a helix coaxial to the axis (X) of said cylindrical body (50); whereby a bottle (2) having its neck (20) inserted into said channel (60) follows the rotation of said cylindrical body (50) and the side walls (64) of said channel (60) such that said neck (20) is drawn along said predetermined course.

2. An apparatus as in claim 1, wherein said fixed body (70) is tubular and is external of and coaxial with said rotating cylindrical body (50).

3. An apparatus as in either of the preceding claims, characterized in that: said guide (7) comprises a slot (71) provided in said fixed body (70) and flanked by facing walls (72); said means for preventing exit of said neck (20) comprising two spaced parallel lips (73), each of which is disposed on a wall (72) of said slot (71) and each of which is adapted to interact with a collar (21) of said neck (20); the spacing between said lips (73) being less than a diameter of said collar (21) and greater than a diameter of said neck (20) of said bottle (2).

4. An apparatus as in claim 3, characterized in that said slot (71) extends in a spiral along said tubular body (70).

5. An apparatus as in claim 4, characterized in that said slot (71) extends by a total angle of 180 degrees.

* * * * *